(12) United States Patent
Ferrucci et al.

(10) Patent No.: US 7,409,608 B1
(45) Date of Patent: Aug. 5, 2008

(54) PSEUDO-RANDOM WAIT-STATE AND PSEUDO-RANDOM LATENCY COMPONENTS

(75) Inventors: Aaron Ferrucci, Santa Cruz, CA (US); Todd Wayne, Soquel, CA (US)

(73) Assignee: Altera Corporation, San Jose, CA (US)

( * ) Notice: Subject to any disclaimer, the term of this patent is extended or adjusted under 35 U.S.C. 154(b) by 210 days.

(21) Appl. No.: 10/829,024

(22) Filed: Apr. 20, 2004

(51) Int. Cl.
*G01R 31/28* (2006.01)
*H04L 1/18* (2006.01)

(52) U.S. Cl. .................. 714/724; 714/749
(58) Field of Classification Search .......... 714/724, 714/749; 710/110, 263
See application file for complete search history.

(56) References Cited

U.S. PATENT DOCUMENTS

| | | | | |
|---|---|---|---|---|
| 5,086,467 A | * | 2/1992 | Malek | 380/252 |
| 5,564,025 A | * | 10/1996 | De Freese et al. | 710/110 |
| 5,892,957 A | * | 4/1999 | Normoyle et al. | 710/263 |
| 5,898,895 A | * | 4/1999 | Williams | 710/60 |
| 6,032,178 A | * | 2/2000 | Bacigalupo et al. | 709/208 |
| 6,112,323 A | * | 8/2000 | Meizlik et al. | 714/748 |
| 7,043,577 B2 | * | 5/2006 | Hooker et al. | 710/105 |

OTHER PUBLICATIONS

U.S. Appl. No. 10/775,966, filed Feb. 9, 2004, by J. Orion Pritchard and Todd Wayne for *Methods And Apparatus For Variable Latency Support*.

* cited by examiner

*Primary Examiner*—James C Kerveros
(74) *Attorney, Agent, or Firm*—Weaver Austin Villeneuve & Sampson LLP (57) ABSTRACT

Methods and apparatus are provided for testing logic, particularly arbitration logic on a programmable chip. Secondary components on a programmable chip are configured with delay mechanisms operable to pseudo-randomly delay responses to requests received using arbitration logic. Requests are typically generated by primary components. The delay mechanisms can be used to test the ability of a programmable chip system to handle a variety of secondary component wait-state and latency characteristics. The delay mechanism can also be used to improve system performance.

29 Claims, 8 Drawing Sheets

PSEUDO-RANDOM WAIT-STATE AND PSEUDO-RANDOM LATENCY COMPONENTS

BACKGROUND OF THE INVENTION

1. Field of the Invention

The present invention relates to digital logic devices. More specifically, the present invention relates to techniques and mechanisms for testing arbitration and bus-mastering logic associated with digital logic devices. Furthermore, the present invention relates to random modulation of response times to improve system performance in a system containing arbitration logic.

2. Description of Related Art

Conventional programmable chip systems generally include a variety of primary and secondary components, such as processors, memory, parallel input/output interfaces, timers, etc. In some cases, the primary and secondary components can interact in a variety of ways. Arbitration logic is used to manage interactions between primary and secondary components. In systems with relatively complex secondary component configurations, arbitration logic can also become complex.

However, techniques and mechanisms for testing arbitration logic associated with programmable chip systems are limited.

Consequently, it is therefore desirable to provide improved methods and apparatus for testing programmable chip systems and particularly arbitration logic in an efficient manner by allowing the simulation of a variety of interaction sequences.

SUMMARY OF THE INVENTION

Methods and apparatus are provided for testing logic, particularly arbitration logic on a programmable chip. Secondary components on a programmable chip are configured with delay mechanisms. Delay mechanisms are operable to pseudo-randomly delay responses to requests received using arbitration logic. Requests are typically generated by primary components. The delay mechanisms can be used to test the ability of a programmable chip system to handle a variety of secondary component wait-state and latency characteristics.

In one aspect, the present invention provides a method for testing arbitration logic or bus-mastering logic associated with a digital logic device. The method includes 1) receiving a request at a secondary component coupled to a primary component through arbitration logic, the request characteristic of a primary component request; 2) determining a pseudo-random delay prior to responding to the request; and 3) pseudo-randomly delaying a response to the request.

Pseudo-randomly delaying includes adjusting the wait-state and/or latency. Further, adjusting the wait-state and/or latency includes selecting a time delay from a delay mechanism. In some cases, the delay mechanism is a linear feedback shift register. In other cases, the delay mechanism uses cyclical redundancy checking.

In one embodiment, the arbitration logic is a simultaneous multiple primary component switching fabric. A plurality of secondary components are coupled to a plurality of primary components through the simultaneous multiple primary component switching fabric. The plurality of secondary components generates pseudo-random delays for requests from the plurality of primary components. The plurality of secondary components pseudo-random delays responses to requests from the plurality of primary components.

In another aspect, the present invention provides a secondary component that includes an interface coupled to an interconnection module, the interface configured to communicate with a primary component through the interconnection module. Also included is a delay mechanism configured to determine values operable to delay responses to requests received through the interconnection module.

The delay mechanism is configured to adjust the wait-state if the request is either a write request or a read request. The values are pseudo-randomly generated values. In one embodiment, the delay mechanism is a linear feedback shift register. In another embodiment, the delay mechanism uses cyclical redundancy checking. In general, the delay mechanism is configured to initiate a counter to execute the time delay. The delay mechanism is configured to adjust the latency and/or wait-state associated with the secondary component.

In yet another aspect, the present invention provides a programmable chip that includes a plurality of primary components; a plurality of secondary components operable to receive requests from the plurality of primary components; and arbitration logic coupling the plurality of primary components to the plurality of secondary components, the arbitration logic operable to arbitrate primary component access requests for secondary components. The plurality of secondary components is configured to determine delay values for adjusting response times to requests received through arbitration logic.

The plurality of secondary components is configured to adjust latency and/or wait-state characteristics associated with response times. In one embodiment, delay values are determined using a linear feedback shift register. In another embodiment, delay values are determined using cyclical redundancy checking. In some cases, the arbitration logic is operable to provide access to secondary components for multiple primary components simultaneously.

Finally, another aspect of the present invention provides an apparatus for testing arbitration logic associated with a programmable chip system. The apparatus includes means for receiving a request at a secondary component coupled to a primary component through arbitration logic, the request characteristic of a primary component request; means for determining a pseudo-random delay prior to responding to the request; and means for pseudo-randomly delaying a response to the request. Pseudo-randomly delaying includes means for adjusting the wait-state and/or latency.

In one embodiment, the present invention provides means for sending the delayed response from the secondary component to the primary component.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

A primary component such as a processor on a programmable chip can access a secondary component such as a memory using arbitration logic. In one example, arbitration logic is configured to provide functionality similar to that of a bus. In other examples, arbitration logic allows multiple primary components to access multiple secondary components simultaneously. Primary and secondary components can be configured with a variety of different parameters. For example, secondary component can be either fixed latency or variably latency. Consequently, interactions between primary and secondary component and the arbitration logic used to handle the interactions can become relatively complex. Therefore, the techniques of the present invention provide mechanisms for testing programmable chip logic, particularly arbitration logic. In one example, a number of interaction sequences between secondary components and other components in the system can be tested by allowing the efficient generation of delay mechanisms within secondary components. Furthermore, the techniques of the present invention allow testing of relatively random and unpredictable sequences of interactions to provide thorough test coverage. In some examples, the techniques of the present invention can be used to test arbitration logic. In other examples, the techniques of the present invention can be used to test primary and secondary components.

In one example, a programmable chip configuration tool allows a user to configure a secondary component with an interface and a delay mechanism. The interface is configured to receive an incoming request and to later send a response to acknowledge the request. However, the delay mechanism may be configured to include a delay mechanism such as a linear feedback shift register (LFSR). The LFSR is used to pseudo-randomly generate a time delay to be captured upon receipt of the incoming request. In addition, the delay mechanism may be configured to include a counter to execute the captured time delay before the response can be sent by the interface.

As will be discussed below, the delay mechanism may be implemented to adjust the wait-state and/or latency associated with secondary component responses. Generally, wait-state is the time the primary component has to wait before a secondary component will accept its request. Latency is the time the secondary component takes to satisfy the request. Therefore, a system containing multiple primary components and pseudo-randomly delayed (on the basis wait-state/latency/both) secondary components may be used to test many aspects of the arbitration logic rapidly and efficiently. Note that the "tasks" which the primary components execute can be quite simple, without sacrificing test coverage. For example, two primary components may vie for read access to a single pseudo-random wait and pseudo-random latency secondary component. The random delays imposed by the secondary component, syncopating with the requests of the primary components, will tend to cycle the arbitration logic through substantially all possible interaction configurations, rather than settling into a regular pattern that would exercise only a limited number of interaction configurations.

Figure 1:
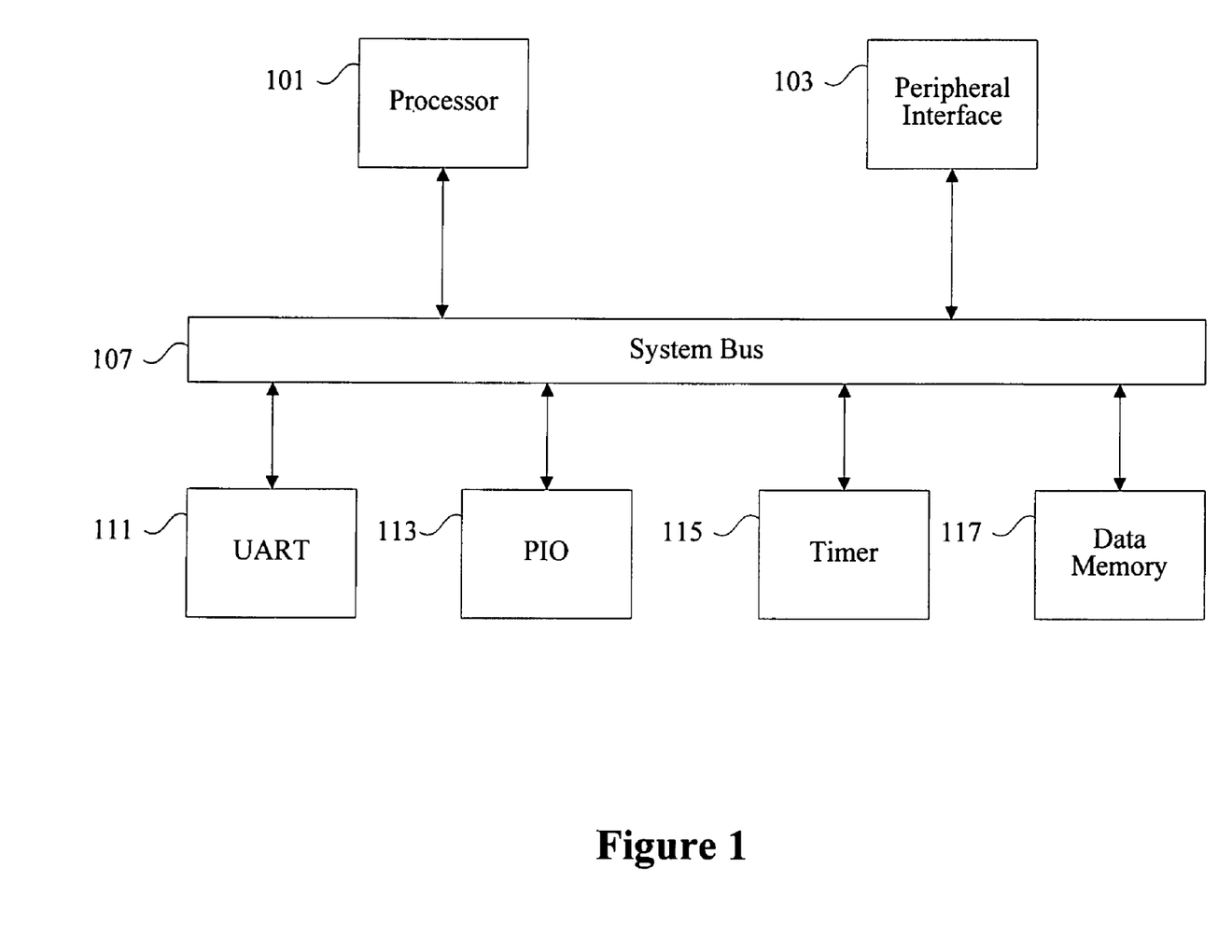
FIG. 1 is a diagrammatic representation showing a programmable chip.

FIG. 1 is a diagrammatic representation showing a system on a programmable chip having a processor core, peripheral devices, and peripheral interfaces. Peripheral devices and peripheral interfaces are herein referred to as components. The system on a programmable chip includes processor core 101 and a peripheral interface 103 as well as peripheral components UART 111, PIO 113, timer 115, and data memory 117. In some examples, the peripheral interface 103 is a memory controller with an associated bus bridge. It should be noted that the system can include both on-chip and off-chip memory. In one example, the data memory 117 can support variable latency or fixed latency.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques of the present invention for pseudo-randomly delaying acknowledgement of an incoming request can be applied to a variety of system architectures. In one example, secondary components with the aforementioned delay mechanism can be supported on a system using a conventional bus architecture.

Figure 2:
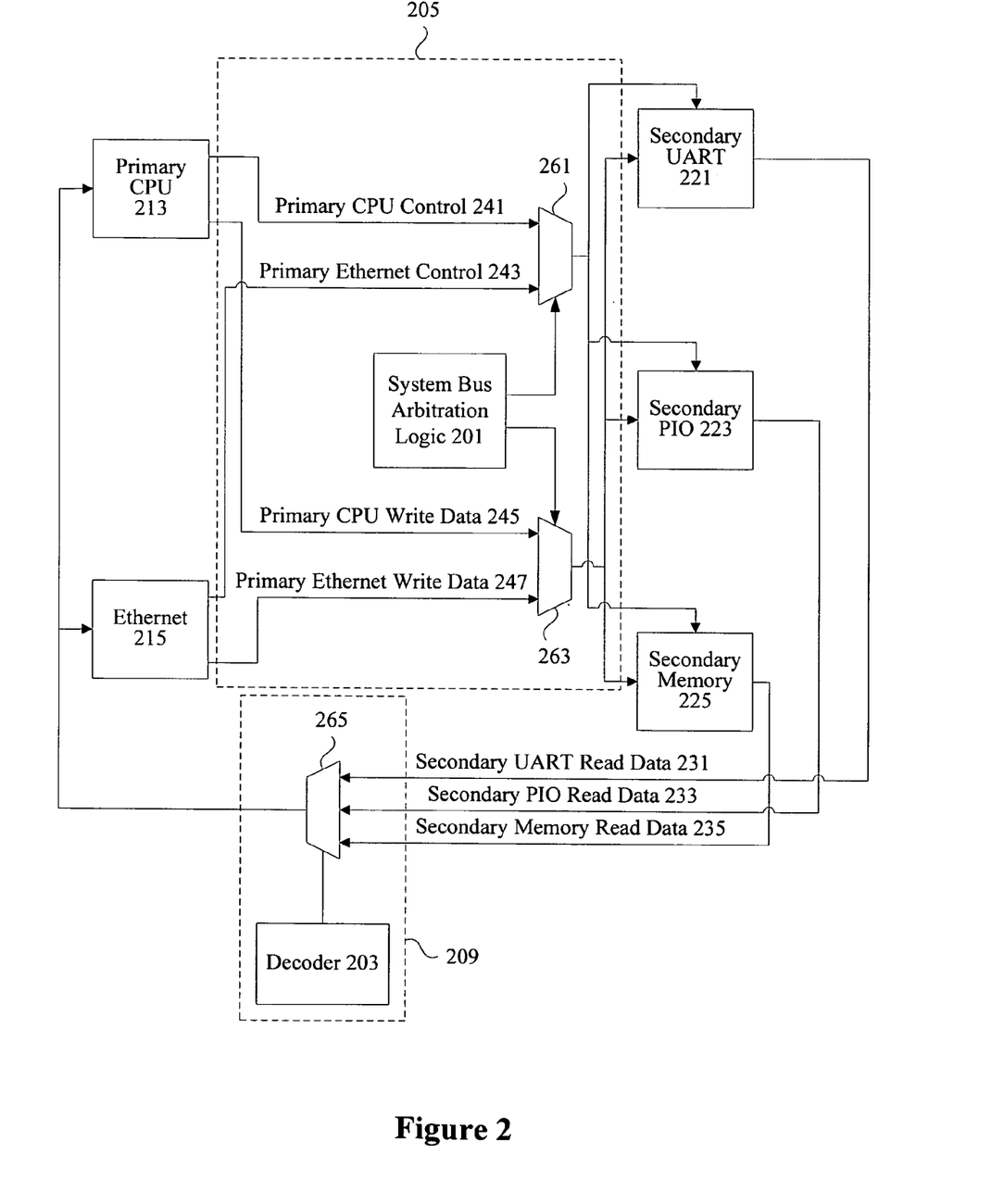
FIG. 2 is a diagrammatic representation showing a system using a conventional bus.

FIG. 2 is a diagrammatic representation depicting a memory component such as an SDRAM coupled to a microprocessor in a system using a conventional bus architecture. The techniques and mechanisms of the present invention recognize that an efficient peripheral interface can be implemented in a system using a conventional bus architecture, even though such an architecture may not be ideal.

A conventional bus architecture includes a system bus arbitrator 205. A system bus arbitrator 205 includes arbitrator switching circuitry 261 and 263 as well as system bus arbitration logic 201. Logic and mechanisms for selecting an input based on a control signal are referred to herein as arbitrator switching circuitry. It should be noted that although switching circuitry generally can be implemented using multiplexers, a variety of mechanisms including switches and transistors can be used.

Any component or device that is operable to initiate read and/or write operations by providing control information is referred to herein as a primary component. Primary components are sometimes referred to as master components. Control information can include a particular address associated with a secondary component. Any component or device that responds to read or write operations with information sent back to the primary component regarding the read or write operation is referred to herein as a secondary component. Secondary components are sometimes referred to as slave components. Some examples of primary components are processors, microcontrollers, and Ethernet devices. Some examples of secondary components are Universal Asynchronous Receiver Transmitters (UARTs), Parallel Input Output (PIO), program memory, and data memory. It should be noted that some components such as an Ethernet component can be both a primary component and a secondary component, as an Ethernet component has the capability of reading and writing to the secondary program memory while also responding to instructions from a primary system CPU.

Logic and mechanisms for providing the control signal based on criteria such as fairness or priority are referred to herein as arbitration logic. The inputs of the arbitrator switching circuitry 261 and 263 are connected to primary CPU 213 and primary Ethernet 215. The outputs of the arbitrator switching circuitry 261 and 263 are connected to secondary UART 221, secondary PIO 223, and secondary memory 225. The outputs of the secondary components transmit information such as read data back to the primary components through a decoder 209. A mechanism for selecting secondary components and translating control information such as addresses is referred to herein as a decoder. In conventional computer systems, there is a single decoder for each bus. A decoder 209 includes decoder logic 203 and decoder switching circuitry 265 for selecting the particular secondary component data transfer. A decoder can also be referred to as a primary side arbitrator including primary side arbitration logic and primary side switching circuitry.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet device is accessing a secondary PIO. While the Ethernet device is accessing the secondary PIO, a processor cannot access an SDRAM through a peripheral interface even if both the primary streaming output device and the peripheral interface are available.

The system bus arbitration logic 201 determines which primary component has access to the system bus at any time. The system bus arbitrator 201 can determine which primary component can access a secondary component based on criteria such as fairness or priority. Any component or device that is configured to ensure that only one primary component can access any one of the secondary components at any given time is referred to herein as a system bus arbitrator. Various schemes such as weighted fairness can be implemented to improve the efficiency of secondary component access, but such schemes can increase system complexity and latency. In conventional implementations, a computer system includes a single system bus arbitrator for each bus in the computer system.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip. Instead of implementing complicated bus sharing schemes using mechanisms such as splitting, the bus itself can be eliminated to improve system performance. According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In some cases, there is a secondary side arbitrator for each secondary component in a computer system. In other cases, there is a secondary side arbitrator for selected secondary components in a system. The techniques of the present invention recognize that fixed and variable latency secondary components can be present in a system using secondary side arbitration. Further discussion on a system using secondary side arbitration is disclosed in U.S. patent application Ser. No. 10/775,966, filed Feb. 9, 2004 and entitled "Methods and Apparatus for variable latency support", the contents which is hereby incorporated by reference.

Although the secondary component delay mechanisms of the present invention can be used in a system bus architecture, the delay mechanisms are particularly useful in a system having a simultaneous multiple primary component interconnection fabric. A simultaneous multiple primary component interconnection fabric allows more sophisticated sequences of interactions between primary and secondary components. The delay mechanisms can be effective in testing these sequences of interactions.

Figure 3:
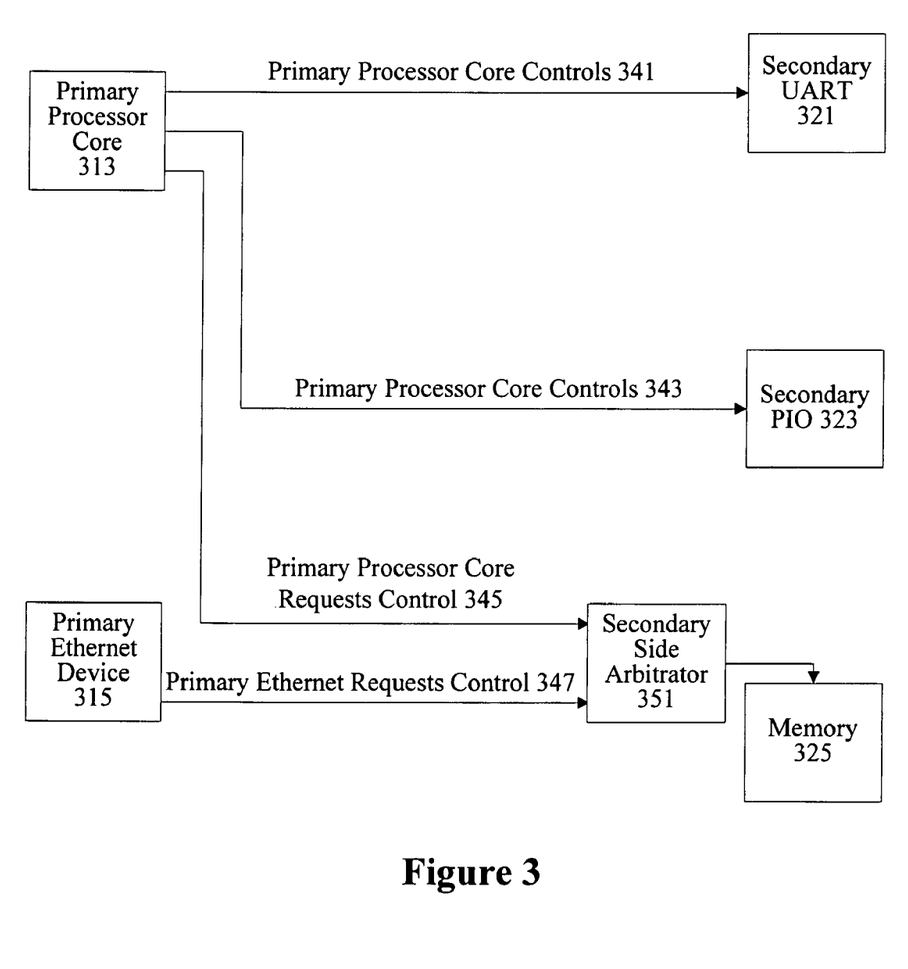
FIG. 3 is a diagrammatic representation showing a system with a primary component and a secondary component.

FIG. 3 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments a secondary component such as peripheral interface 325 is associated with a secondary side arbitrator 351. However, secondary components UART 321 and PIO 323 are not associated with any arbitrator. In one example, secondary component UART 321 and secondary PIO 323 can only be accessed by primary CPU 313 and not by primary Ethernet device 315. A secondary memory component 325, however, can be accessed by both primary CPU 313 and primary Ethernet device 315.

According to various embodiments, a secondary side arbitrator 351 allows a first secondary component in a system to be accessed by a first primary component at the same time a second secondary component in the system is accessed by a second primary component. For example, peripheral interface 325 can be accessed by primary Ethernet 315 through secondary side arbitrator 351 at the same time, secondary UART 321 is accessed by primary CPU 313.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

In one example, a secondary component can receive multiple read request addresses before any data is returned using a pseudo-random delay mechanism. Typically, arbitration logic or an interconnection module receives a request from a primary component and asserts a corresponding request to the secondary component. According to various embodiments of the present invention, the secondary component is configured to pseudo-randomly delay the acknowledgment of the incoming request. This may include delaying either the wait-state or latency aspects of the secondary component interaction response. The response may include acknowledging the request by asserting/de-asserting a wait request or read data valid signal. Any mechanism used to couple primary and secondary components is referred to herein as arbitration logic or an interconnection module.

Figure 4:
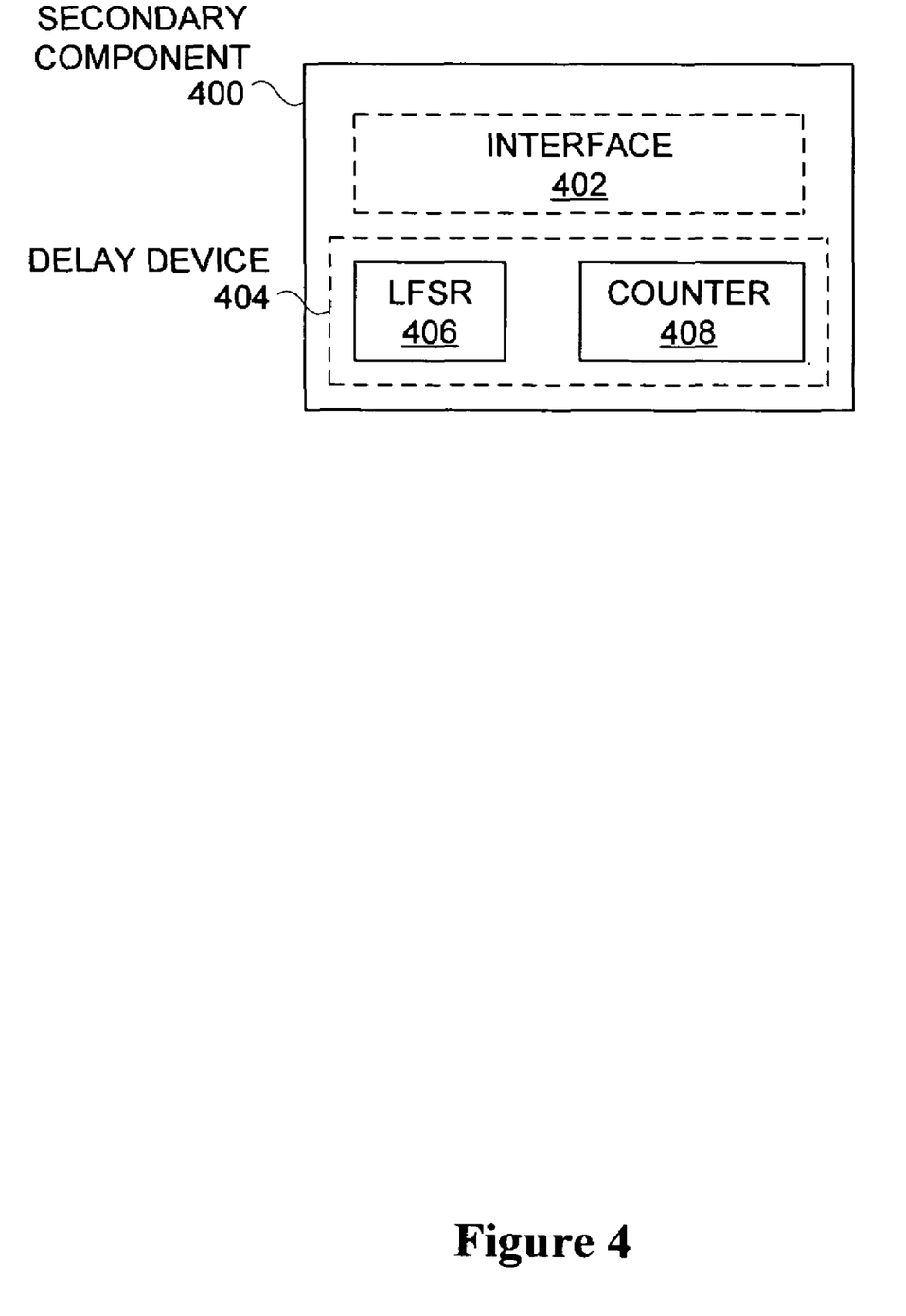
FIG. 4 is a linear feedback shift register (LFSR) implemented pseudo-random delay mechanism associated with a secondary component.

FIG. 4 is a linear feedback shift register (LFSR) implemented pseudo-random delay mechanism associated with a secondary component. As shown, secondary component 400 (e.g., 305) includes an interface 402 and a delay mechanism 404. Interface 402 is typically used to couple to an interconnection module where it is configured to communicate with the interconnection module. Delay mechanism 404 is configured to pseudo-randomly delay acknowledgment of a request from the interconnection module via interface 402. The request may have originated from a primary component.

In general, delay mechanism 404 is also configured to adjust the wait-state and/or latency in acknowledging the request. If the request is a write request, delay mechanism 404 would typically adjust only the wait-state. If the request is a read request, delay mechanism 404 may adjust the wait-state, the latency, or both wait-state and latency. In addition, delay mechanism 404 may be configured to select a time delay from a delay mechanism, such as linear feedback shift register 406. Any other conventional technique may be employed for the delay mechanism. For example, the delay mechanism may use cyclical redundancy check (CRC).

According to various embodiments of the present invention, the delay mechanism is implemented together with a counter 408. The delay mechanism (e.g., LFSR 406) is used to pseudo-randomly generate an arbitrary time delay value. Delay mechanism 404 may then capture the value anytime after receiving the request. Delay mechanism 404 may then initiate counter 408 to execute the captured time delay. Upon completing the execution of the captured time delay, delay mechanism 404 can signal interface 402 to acknowledge the request. Depending on the request, the acknowledgement may come in any number of ways. For example, a write request may simply have an acknowledgement indicating that the write request was received. Yet, a read request may have an acknowledgment of indicating that the read request was received and of transferring the data that the read request sought. Typically, interface 402 is configured to acknowledge the request by sending a response from secondary component 400 to the interconnection module or primary component.

Secondary component 400 may include any number of interface 402 and/or delay mechanism 404. Separate interfaces 402 or delay mechanisms 404 may be used for a particular type of request. On the other hand, a common interface 402 or delay mechanism 404 may be used for all types of requests. In one embodiment, common interface 402 and delay mechanism 404 are implemented in a megafunction for a programmable chip.

Figure 5:
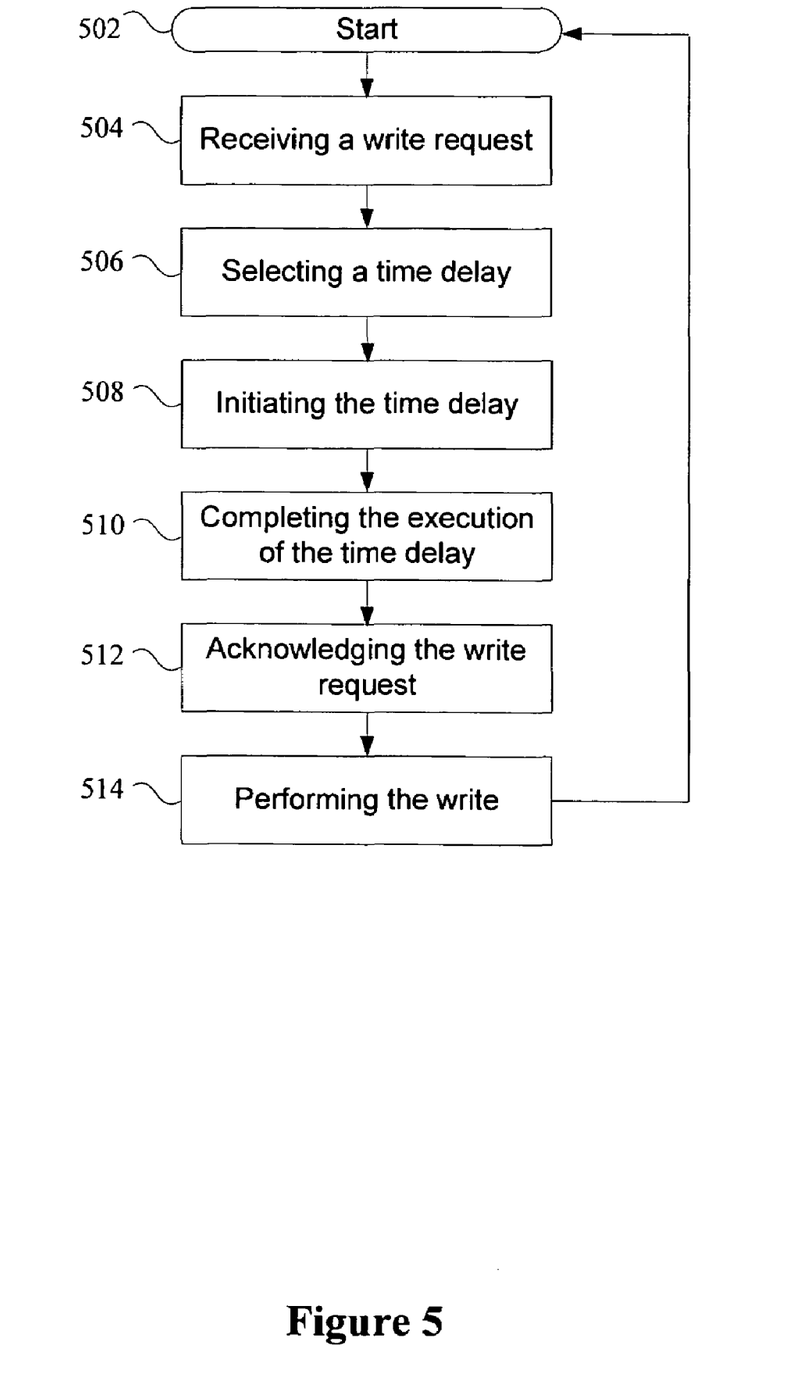
FIG. 5 is a flow process diagram showing the pseudo-random delay of acknowledging a write request intended for a secondary component.

FIG. 5 is a flow process diagram showing a pseudo-randomly delayed response to a write request. At operation 502, the flow process diagram begins. This may be the point where the secondary component is in a waiting state. Once a write request to the secondary component has been sent by a component (e.g., primary component; interconnection module) in the system, the receipt of the write request by the secondary component is performed at 504. At this point, the secondary component may proceed to pseudo-randomly delay acknowledgment of the request at 506, 508, and 510. In one embodiment, this includes adjusting the wait-state by first selecting a time delay from a delay mechanism at 506.

Although many other delay mechanisms/techniques (e.g., CRC) may be used, the present invention uses a LFSR according to various embodiments. Any conventional LFSR may be implemented. The LFSR allows the ability to generate a pseudo-random time delay value. Typically, the LFSR will be properly seeded and initialized before receiving the write request at 504 (e.g., on reset or startup). In effect, the LFSR shuffles through random values of time delay. The time delay value may be captured upon receipt of the read request or some time later. After the time delay value is selected (e.g., captured) at 506, initiating a counter to execute the captured time delay value is performed at 508. Next, completing the execution of the time delay is performed at 510.

After the time delay has completed, the secondary component may perform operation 512 in acknowledging the write request. This includes sending a response from the secondary component to the primary component or interconnection module. As shown in FIG. 5, performing the write can be optionally executed at 514. Then the flow process returns back to operation 502 and waits for the receipt of another write request. The flow process can be repeated as many times as necessary. It will be apparent to those skilled in the art that any of the operations in FIG. 5 may be rearranged, omitted, or substituted. For example, operation 514 may be performed after operation 504 and before operation 506. Alternatively, operation 514 may be performed simultaneously with operation 512.

The pseudo-random distribution may be customized to the particular system. For example, to provide a uniform distribution of wait-states between 0 and 7 cycles, a LFSR is implemented in digital logic. At the onset of an access, three bits of the LFSR are used to initialize a counter which decrements on each cycle. When the counter reaches 0, the secondary component signals the interconnection module (e.g., bus; arbitration logic) that the transaction has completed. In a similar manner, pseudo-random latency may be implemented by delaying the assertion of a data available signal. The function of the secondary component beyond its bus cycle timing is not otherwise affected by this latency. It is important to note that the LFSR can have more wait-states (e.g., 128, 256) by having more bits. Furthermore, any number of bits of the LFSR may be used to initialize the counter. As such, the present invention allows a rapid and efficient testing of the arbitration logic by simulating as many possible interaction configurations between the secondary component and other components in the system (e.g., primary component, interconnection module, etc.).

Figure 6:
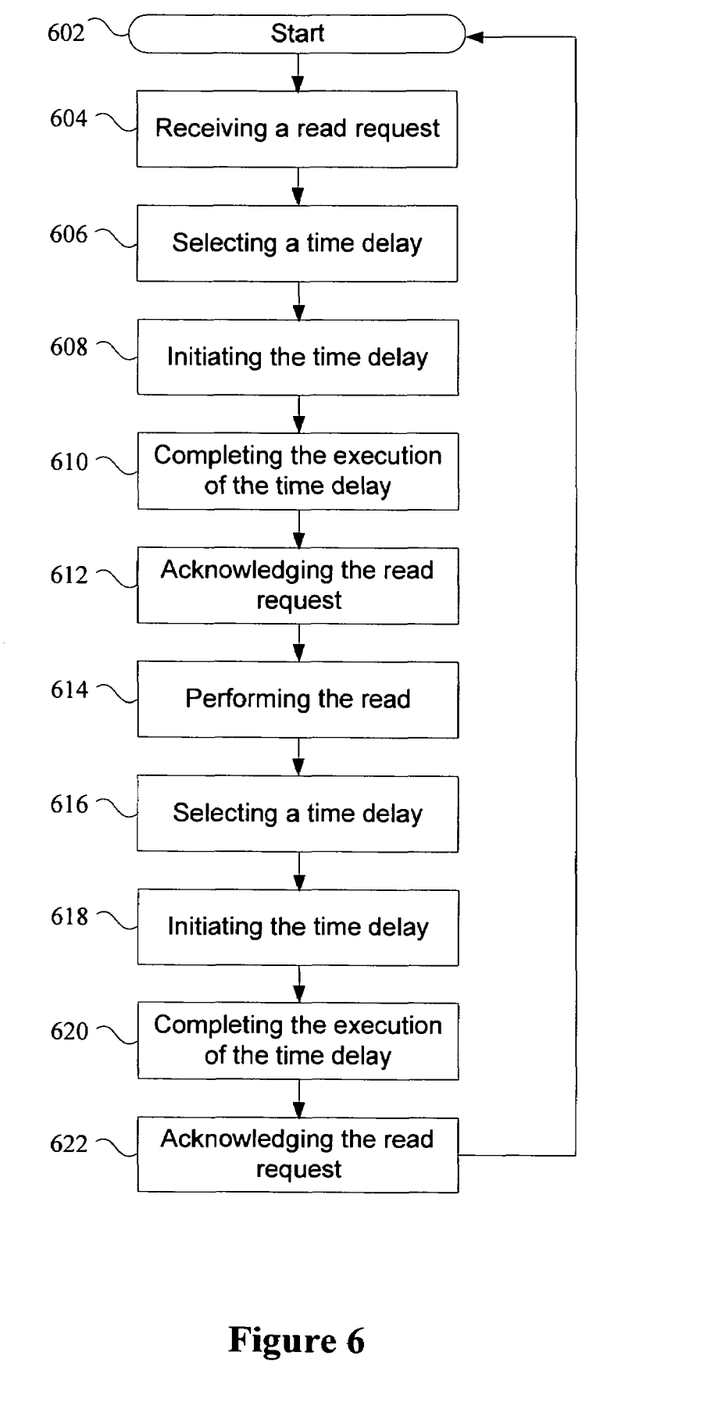
FIG. 6 is a flow process diagram showing the pseudo-random delay of acknowledging a read request intended for a secondary component.

FIG. 6 is a flow process diagram showing a pseudo-randomly delayed response to a read request. Operations 602, 604, 606, 608, 610, 612, and 614 are similar to operations 502, 504, 506, 508, 510, 512, and 514 respectively except that the operations are performed for a read request as opposed to a write request. It should be noted that performing the wait-state delay in operations 606, 608, and 610 is optional. Furthermore, performing the latency delay in operations in 616, 618, and 620 is also optional.

Beginning at operation 602, the flow process diagram begins. Here, the secondary component is in a state waiting for the incoming read request. At 604, a read request is received. At 606, 608, and 610, pseudo-random wait-state delay is introduced. Operation 606, 608, and 610 may utilize the mechanism/techniques as discussed earlier for operations 506, 508, and 510. Thereafter, the acknowledgment of the read request is performed at 612. Typically, this includes sending a response from the secondary component to the requestor (e.g., primary component via an interconnection module). An interface (e.g., 402) may be used for the purpose of facilitating this communication between the secondary component and other components in the system. Since operations 606, 608, and 610 are optional, operation 612 can be performed directly after operation 604. Next, performing the read may be optionally executed at 614.

After acknowledging the read request, a latency delay may be optionally introduced. The techniques and mechanisms used for introducing latency are similar to that of wait-state. Beginning at operation 616, a time delay is determined. Next, initiating the time delay is performed at 618. Afterwards, completing the execution of the time delay is done at 620. As mentioned earlier, operations 616, 618, and 620 are optional. Therefore, the flow process may go directly from performing the read at 614 to again acknowledge the read request at 622. This may include sending the data sought by the read request or asserting signals (e.g., read data valid) back to the requestor (e.g., primary component, interconnection module, etc.). At this point, the flow process returns back to operation 602 and waits for the receipt of another read request. The flow process can be repeated as many times as necessary. It will be apparent to those skilled in the art that any of the operations in FIG. 6 may be rearranged, omitted, or substituted. For example, operation 614 may be performed after operation 620 and before operation 622 or even omitted altogether.

In some embodiments, a primary component posts a read to the secondary component, and if a wait request is not signaled, the primary component is free to access other secondary components while waiting for the data valid signal. Furthermore, the primary component can re-access the same secondary component before any previous requests are satisfied. The wait signal remains functional in the case that the secondary components buffer becomes filled with read requests.

According to various embodiments, secondary components are configured to include pseudo-random delay mechanisms. In some instances, a user can select, parameterize, and connect secondary components automatically using a programmable chip tool. A user can select whether secondary components should include pseudo-random wait-state and/or latency delays and appropriate mechanisms are generated to support the desired configuration. As such, it is possible to have multiple primary components interacting with multiple secondary components that are configured to pseudo-randomly produce numerous interaction configurations in the system; thereby, allowing a thorough testing of system arbitration logic.

Figure 7:
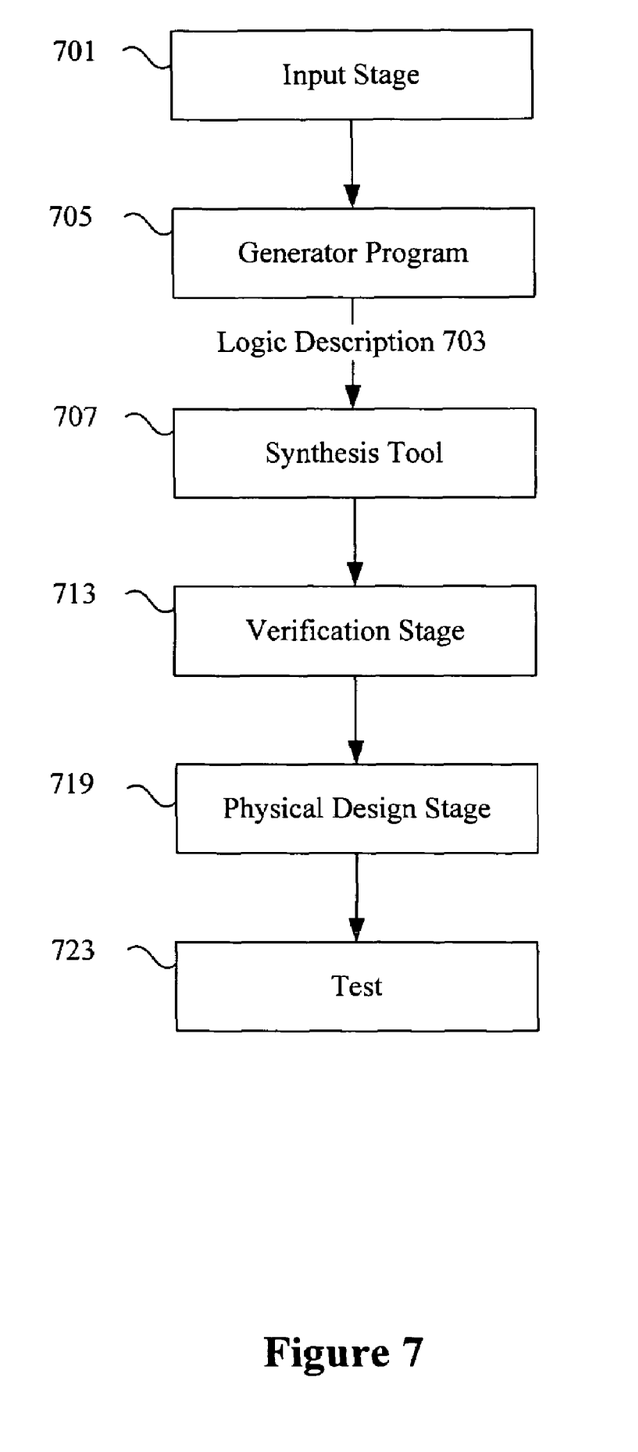
FIG. 7 is a diagrammatic representation showing implementation of a programmable chip.

FIG. 7 is a diagrammatic representation showing implementation of an electronic device using a programmable chip tool. An input stage 701 receives selection information typically from a user for logic such as a processor core as well as other components such as a streaming output device to be implemented on an electronic device. A generator program 705 creates a logic description and provides the logic description along with other customized logic to any of a variety of synthesis tools, place and route programs, and logic configuration tools to allow a logic description to be implemented on an electronic device.

In one example, an input stage 701 often allows selection and parameterization of components to be used on an electronic device. The input stage 701 also allows configuration of pseudo-random delay mechanisms. In some examples, components provided to an input stage include intellectual property functions, megafunctions, and intellectual property cores. The input stage 701 may be a graphical user interface using wizards for allowing efficient or convenient entry of information. The input stage may also be a text interface or a program reading a data file such as a spreadsheet, database table, or schematic to acquire selection information. The input stage 701 produces an output containing information about the various modules selected.

In typical implementations, the generator program 705 can identify the selections and generate a logic description with information for implementing the various modules. The generator program 705 can be a Perl script creating HDL files such as Verilog, Abel, VHDL, and AHDL files from the module information entered by a user. According to various embodiments, the generator program 705 also provides information to a synthesis tool 707 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 701, generator program 705, and synthesis tool 707 can be separate programs. The interface between the separate programs can be a database file, a log, or simply messages transmitted between the programs. For example, instead of writing a file to storage, the input stage 701 can send messages directly to the generator program 705 to allow the generator program to create a logic description. Similarly, the generator program can provide information directly to the synthesis tool instead of writing HDL files. Similarly, input stage 701, generator program 705, and synthesis tool 707 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 707.

A synthesis tool 707 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 713 typically follows the synthesis stage 707. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 713, the synthesized netlist file can be provided to physical design tools 719 including place and route and configuration tools. A place and route tool typically locates logic cells on specific logic elements of a target hardware device and connects wires between the inputs and outputs of the various logic elements in accordance with logic required to implement an electronic design. The device can also be physically tested at 723.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 701, the generator program 705, the synthesis tool 707, the verification tools 713, and physical design tools 719 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 8:
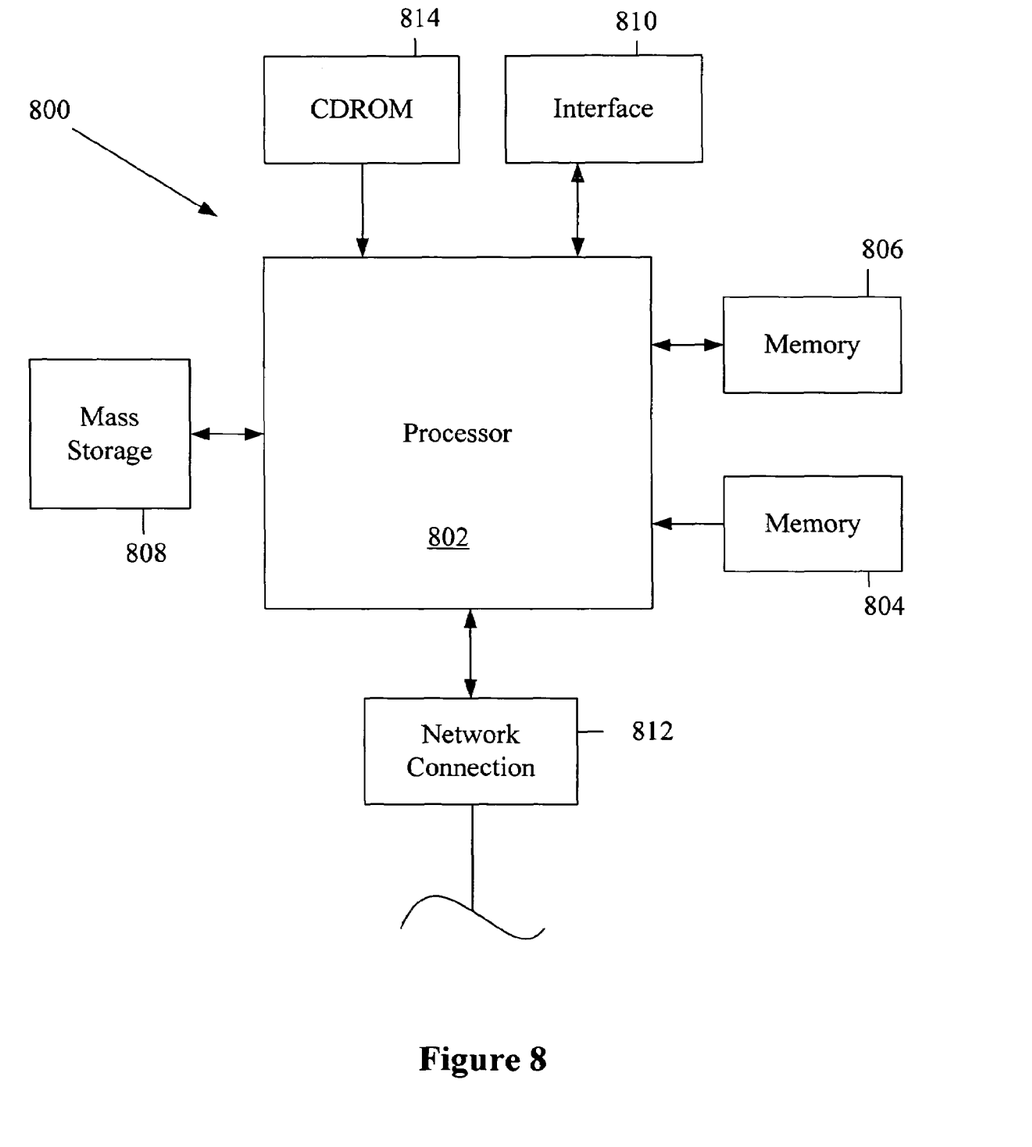
FIG. 8 is a diagrammatic representation of a system that can be used to implement the programmable chip.

FIG. 8 illustrates a typical computer system that can be used to implement a programmable chip having pseudo-random delay (e.g., wait-state and/or latency) secondary components. The computer system 800 includes any number of processors 802 (also referred to as central processing units, or CPUs) that are coupled to devices including memory 806 (typically a random access memory, or "RAM"), memory 804 (typically a read only memory, or "ROM"). The processors 802 can be configured to generate a test sequences for any designated processor. As is well known in the art, memory 804 acts to transfer data and instructions uni-directionally to the CPU and memory 806 is used typically to transfer data and instructions in a bi-directional manner.

Both of these memory devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than memory. The mass storage device 808 can be used to hold a library or database of prepackaged logic or intellectual property functions, as well as information on generating particular configurations. It will be appreciated that the information retained within the mass storage device 808, may, in appropriate cases, be incorporated in standard fashion as part of memory 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. It should be noted that the system 800 may also be associated with devices for transferring completed designs onto a programmable chip. The above-described devices and materials will be familiar to those of skill in the computer hardware and software arts.

The present invention provides many advantages. For example, the pseudo-random wait-state/latency secondary components will tend to rapidly expose logic flaws in arbitration logic, master logic, as well as in mastering peripherals. Another example is in a TCP/IP type system, where random response times can be advantageous to system performance (e.g., in the event of multiple slaves simultaneously responding). Furthermore, the secondary components of the present invention are simple to configure and cost effective. A small number of systems can be built containing the pseudo-random wait-state and/or latency secondary components. Executing bus transactions in such systems in physical hardware can exercise substantially all facets of arbitration and master bus interface logic efficiently. In addition, a test harness featuring random wait-state/latency secondary components can be generated automatically.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method for testing arbitration logic or bus-mastering logic associated with a digital logic device, the method comprising:
   receiving a request at a secondary component coupled to a primary component through arbitration logic, the request characteristic of a primary component request;
   determining a pseudo-random delay at the secondary component prior to responding to the request; and
   sending a response from the secondary component after the pseudo-random delay, the response corresponding to the request.

2. The method of claim 1, wherein the pseudo-random delay is used to adjust the wait-state of the secondary component, wherein the wait-state is an amount of time the primary component has to wait before the secondary component accepts the request.

3. The method of claim 1, wherein the pseudo-random delay is used to adjust the latency of the secondary component, wherein the latency is an amount of time the secondary component takes to satisfy the request.

4. The method of claim 3, wherein a delay mechanism used to introduce the pseudo-random delay is a linear feedback shift register.

5. The method of claim 4, wherein the delay mechanism uses cyclical redundancy checking.

6. The method of claim 5, wherein responding to the request comprises:
   sending a response from the secondary component to the primary component.

7. The method of claim 1, wherein the arbitration logic is a simultaneous multiple primary component switching fabric.

8. The method of claim 7, wherein a plurality of secondary components are coupled to a plurality of primary components through the simultaneous multiple primary component switching fabric.

9. The method of claim 8, wherein the plurality of secondary components generate pseudo-random delays for requests from the plurality of primary components.

10. The method of claim 9, wherein the plurality of secondary components pseudo-random delay responses to requests from the plurality of primary components.

11. The method of claim 1, wherein the pseudo-random delay is used to adjust the wait-state of the secondary component.

12. The method of claim 1, wherein the pseudo-random delay is used to adjust the latency of the secondary component.

13. A secondary component, comprising:
   an interface coupled to an interconnection module, the interface configured to communicate with a primary component through the interconnection module; and
   a delay mechanism configured to determine values operable to delay responses to requests received through the interconnection module, wherein the values are pseudo-randomly generated values, wherein the values include a first value used to adjust the wait-state of the secondary component and a second value used to adjust the latency of the secondary component, wherein the wait-state is time the primary component has to wait before the second component accepts requests and the latency is time the secondary component takes to respond to the request.

14. The secondary component of claim 13, wherein the delay mechanism is configured to adjust the wait-state if the request is either a write request or a read request.

15. The secondary component of claim 13, wherein the delay mechanism is a linear feedback shift register.

16. The secondary component of claim 13, wherein the delay mechanism uses cyclical redundancy checking.

17. The secondary component of claim 13, wherein the delay mechanism is configured to initiate a counter to execute the time delay.

18. The secondary component of claim 13, wherein the delay mechanism is configured to adjust the latency associated with the secondary component.

19. The secondary component of claim 13, wherein the delay mechanism is configured to adjust the wait-state associated with the secondary component.

20. A programmable chip, comprising:
   a plurality of primary components, wherein the plurality of primary components are master components on the programmable chip;
   a plurality of secondary components operable to receive requests from the plurality of primary components, wherein the plurality of secondary components are slave components on the programmable chip; and
   arbitration logic coupling the plurality of primary components to the plurality of secondary components, the arbitration logic operable to arbitrate primary component access requests for secondary components;
   wherein the plurality of secondary components are configured to determine delay values for adjusting response times to requests received through arbitration logic, wherein the values are pseudo-randomly generated values, wherein the values include a first value used to adjust the wait-state of the secondary component and a second value used to adjust the latency of the secondary component, wherein the wait-state is time the primary component has to wait before the second component accepts requests and the latency is time the secondary component takes to respond to the request.

21. The programmable chip of claim 20, wherein the plurality of primary and secondary components include processor and memory components.

22. The programmable chip of claim 20, wherein the plurality of secondary components are configured to adjust latency characteristics associated with response times.

23. The programmable chip of claim 20, wherein the plurality of secondary components are configured to adjust wait-state characteristics associated with response times.

24. The programmable chip of claim 20, wherein delay values are determined using a linear feedback shift register.

25. The programmable chip of claim 20, wherein delay values are determined using cyclical redundancy checking.

26. The programmable chip of claim 20, wherein the arbitration logic is operable to provide access to secondary components for multiple primary components simultaneously.

27. An apparatus for testing arbitration logic associated with a programmable chip system, the apparatus comprising:

means for receiving a request at a secondary component coupled to a primary component through arbitration logic, the request characteristic of a primary component request;

means for determining a pseudo-random delay at the secondary component prior to responding to the request; and means for sending a response from the secondary component after the pseudo-random delay, the response corresponding to the request to test arbitration logic or bus-mastering logic associated with the digital logic device.

28. The apparatus of claim 27, wherein the pseudo-random delay is used to adjust the wait-state of the secondary component, wherein the wait-state is an amount of time the primary component has to wait before the secondary component accepts the request.

29. The apparatus of claim 27, further comprising:

means for sending the delayed response from the secondary component to the primary component.

* * * * *